United States Patent
Uehara et al.

(10) Patent No.: US 8,556,297 B2
(45) Date of Patent: Oct. 15, 2013

(54) FENDER LINER FOR VEHICLE AND METHOD FOR FABRICATING THE SAME

(75) Inventors: Masahiro Uehara, Higashi-Hiroshima (JP); Tomohiro Manji, Higashi-Hiroshima (JP); Nobuyuki Tanigawa, Higashi-Hiroshima (JP); Kyota Matsuo, Toyota (JP)

(73) Assignees: HIROTANI Co., Ltd., Hiroshima (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/504,119

(22) PCT Filed: May 17, 2011

(86) PCT No.: PCT/JP2011/002733
§ 371 (c)(1),
(2), (4) Date: Apr. 25, 2012

(87) PCT Pub. No.: WO2011/145331
PCT Pub. Date: Nov. 24, 2011

(65) Prior Publication Data
US 2013/0062871 A1    Mar. 14, 2013

(30) Foreign Application Priority Data
May 18, 2010    (JP) ................... 2010-114593

(51) Int. Cl.
*B62D 25/18*    (2006.01)
(52) U.S. Cl.
USPC ........................................ 280/851; 296/39.3
(58) Field of Classification Search
USPC ................... 280/850–852; 296/39.3
See application file for complete search history.

(56) References Cited

U.S. PATENT DOCUMENTS

| 5,000,483 A | 3/1991 | Blumel |
| 8,167,335 B2 * | 5/2012 | Takeuchi ..................... 280/851 |
| 2003/0062738 A1 | 4/2003 | Fujii et al. |
| 2004/0055813 A1 | 3/2004 | Tsuiki et al. |
| 2006/0214474 A1 | 9/2006 | Omiya et al. |
| 2009/0117806 A1 | 5/2009 | Kaneda |
| 2010/0078927 A1 | 4/2010 | Takeuchi |

FOREIGN PATENT DOCUMENTS

| CN | 101032937 A | 9/2007 |
| CN | 101410273 A | 4/2009 |
| DE | 298 07 563 U1 | 7/1998 |
| DE | 20 2005 015164 U1 | 12/2005 |

(Continued)

OTHER PUBLICATIONS

Extended European search report dated Apr. 29, 2013 in corresponding European Application No. 11783268.3.

*Primary Examiner* — John Walters
*Assistant Examiner* — James Triggs
(74) *Attorney, Agent, or Firm* — Knobbe Martens Olson & Bear LLP

(57) ABSTRACT

To provide a vehicle fender liner configured to easily form a solid shape and exhibit superior sound-absorption performance and excellent anti-icing, a fender liner 10 serving as a sound-absorption member to be attached to a vehicle includes a base-material layer 11 having sound-absorption function. The base-material layer 11 is formed into a solid shape of a fender liner by producing a sheet of a fibrous web 14 obtained by interlocking main fibers 12 and binder fibers 13 having a melting point lower than that of the main fibers 12, integrally providing a waterproof protective film of an LDPE resin, and then performing hot press mold.

3 Claims, 12 Drawing Sheets

(56) References Cited

FOREIGN PATENT DOCUMENTS

| | | |
|---|---|---|
| EP | 0 204 681 A2 | 12/1986 |
| JP | 06-278658 A | 10/1994 |
| JP | 2000-264255 A | 9/2000 |
| JP | 2002-348767 A | 12/2002 |
| JP | 2003-112661 A | 4/2003 |
| JP | 2003-122373 A | 4/2003 |
| JP | 2003-216158 A | 7/2003 |
| JP | 2003-306068 A | 10/2003 |
| JP | 3790493 B2 | 4/2006 |
| JP | 2008-126469 A | 6/2008 |
| JP | 2009-18746 A | 1/2009 |
| WO | 2008/155962 A1 | 12/2008 |

* cited by examiner

FIG.11

| SAMPLE | | EXAMPLE 1 | EXAMPLE 4 | COMPARATIVE EXAMPLE 1 (NONWOVEN FABRIC) | COMPARATIVE EXAMPLE 2 (HDPE) | COMPARATIVE EXAMPLE 3 (NONWOVEN FABRIC/ HDPE) |
|---|---|---|---|---|---|---|
| BASIS WEIGHT($g/m^2$) | | 800 | 800 | 800 | 1100 | 800 |
| THICKNESS(mm) | | 2.8 | 2.8 | 3.3 | 1.2 | 2.8 |
| ICING TEST | SHEARING FORCE | 19.5N | 18.3N | 221.4N | 17.9N | 18.7N |
| | SURFACE CONDITION | SUFFICIENT ICE REMOVAL AND GOOD SURFACE CONDITION | SUFFICIENT ICE REMOVAL AND GOOD SURFACE CONDITION | ICE REMAINS AND SURFACE NONWOVEN FABRIC FLUFFS IN REMOVAL | SUFFICIENT ICE REMOVAL AND GOOD SURFACE CONDITION | SUFFICIENT ICE REMOVAL AND GOOD SURFACE CONDITION |
| DURABILITY TEST WITH STONE CHIP TEST | | NO MATERIAL FAILURE IN RESIN LAYER | NO MATERIAL FAILURE IN RESIN LAYER | NONWOVEN FABRIC IS PARTIALLY REMOVED AND IS PENETRATED | NO MATERIAL FAILURE IN BASE MATERIAL | SPLITS IN RESIN LAYER MINUTE CRACKS IN SURFACE |

300

STATE OF RECESS FORMED BY PRESSING $z^2 = x^2 + y^2$

CALCULATE EXTENSIBILITY DEGREE BASED ON THE PYTHAGOREAN THEOREM

FIG.13

| | BASE-MATERIAL LAYER SIDE | 210°C | 210°C | 210°C |
|---|---|---|---|---|
| TEMPERATURE SETTING | WATERPROOF PROTECTIVE FILM SIDE | 180°C | 150°C | 110°C |
| EXTENSIBILITY DEGREE | EXAMPLE 1 | 63.0% | 49.0% | 12.0% |
| | COMPARATIVE EXAMPLE 3 (NONWOVEN FABRIC/ HDPE) | 45.8% | 25.9% | — |

FENDER LINER FOR VEHICLE AND METHOD FOR FABRICATING THE SAME

CROSS-REFERENCE TO RELATED APPLICATIONS

This application is the U.S. National Phase under 35 U.S.C. §371 of International Application PCT/JP2011/002733, filed May 17, 2011, which claims priority to Japanese Patent Application No. 2010-114593, filed May 18, 2010. The International Application was published under PCT Article 21(2) in a language other than English.

TECHNICAL FIELD

The present disclosure relates to a fender liner which is attached to the inner surface of a wheel well of a vehicle body to reduce impact noise by absorbing impact caused by a collision of foreign objects such as stones bounced during driving of a vehicle, and from which attached ice is easily peeled off, and also relates to a method for fabricating the fender liner.

BACKGROUND ART

In general, a fender liner including nonwoven fabric made of a large number of interlocked short fibers is known as a fender liner (see PATENT DOCUMENT 1). In such a fender liner including nonwoven fabric, a large number of gaps formed among interlocked fibers absorb impact caused by a collision of foreign objects. Accordingly, the fender liner has impact resistance and a sound deadening property (especially a sound-absorption property). The fender liner, however, has poor sound insulation performance, and thus the sound deadening performance thereof is insufficient. In addition, since water attached to the fender liner enters the inside of the fender liner through osmosis, when the water is frozen, ice grows to reach the inside of the fender liner, resulting in difficulty in peeling off the ice.

Examples of known molded products include a molded product using a high density polyethylene (HDPE) resin or a molded product using a hard fiberboard in which hard styrene-butadiene rubber is mixed in polyester fiber, in order to protect a fender against a collision with stones or the like bounced off by the tires, a splash of muddy water or the like during driving on a puddle, and a collision, for example, (see PATENT DOCUMENT 2). A fender liner using the hard fiberboard is superior to that using nonwoven fabric in terms of the function of reducing deformation and damage, for example, of the fender liner caused by collision with stones or the like. However, the resin of the hard fiberboard does not have a sound-absorption property, and has poor sound insulation performance. Accordingly, engine noise and road noise are not sufficiently reduced. Further, molded products using the HDPE resin or hard fiberboards have poor sound deadening performance because an impact such as a collision with stones or the like, a splash of muddy water or the like, and a collision is changed into sound in a frequency range which is easily heard by a human.

Furthermore, a fender liner configured to improve water resistance and resistance to adhesion of foreign objects by covering, with a waterproof film, the surface of a sound-deadening cushioning material made of nonwoven fabric is known (see PATENT DOCUMENT 3).

CITATION LIST

Patent Document

PATENT DOCUMENT 1: Japanese Patent Publication No. 2003-112661
PATENT DOCUMENT 2: Japanese Patent Publication No. 2000-264255
PATENT DOCUMENT 3: Japanese Patent Publication No. 2002-348767

SUMMARY OF THE INVENTION

Technical Problem

Specifically, a fender liner as shown in PATENT DOCUMENT 1 is superior to a resin-molded product in impact resistance and a sound deadening property, but is inferior to the resin-molded product in anti-icing.

On the other hand, a fender liner as shown in PATENT DOCUMENT 2 is superior to a fender liner made of nonwoven fabric in deformation and damage, for example, of the fender liner caused by collision with stones or the like, but cannot sufficiently reduce engine noise and road noise.

Further, a product shown in PATENT DOCUMENT 3 is a fender liner including nonwoven fabric having a sound-absorption function and a water-resistant resin film having water repellency. In this fender liner, a resin film made of an olefin-based resin having a high melting point is overlaid on the surface of a fibrous web made of nonwoven fabric formed by interlocking main fibers with binder fibers having a melting point lower than that of the main fibers, and the resin film and the fibrous web are press-molded together, thereby bonding the resin film to the nonwoven fabric and shaping the resin film and the nonwoven fabric.

However, in the hot press molding for forming the stack of the nonwoven fabric and the resin film into a desired solid shape, the nonwoven fabric and the resin film are bonded together. In view of this process, a resin having a high melting point (i.e., higher than or approximately equal to that of main fibers of the nonwoven fabric) is employed so as to prevent melt fracture of the resin film caused by heat in the press molding. The use of such a resin leads to insufficient flowability of the resin film in shaping the fender liner, and thus the film becomes locally thin. As a result, a deep-drawing portion, for example, of the resin film might be torn in some cases.

The present disclosure has been achieved, focusing on problems of conventional techniques as described above. An object of the present disclosure is to provide a vehicle fender liner configured to be easily formed into a solid shape, and exhibit a superior sound-absorption performance and excellent anti-icing.

Solution to the Problem

In a first aspect of the present disclosure, a vehicle fender liner includes: a base-material layer having a sound-absorption function; and a waterproof protective film provided on a surface of the base-material layer, wherein the base-material layer includes a fibrous web formed by interlocking main fibers and binder fibers having a melting point lower than that of the main fibers, and an LDPE resin is integrally provided as the waterproof protective film.

In a second aspect of the present disclosure, in the vehicle fender liner of the first aspect, the waterproof protective film of the LDPE resin has a softening point substantially equal to that of the binder fibers of the base-material layer.

In a third aspect of the present disclosure, in the vehicle fender liner of the first or second aspect, the base-material layer has a basis weight of 300 g/m² to 1000 g/m², a ratio of the main fibers to the binder fibers is main fibers: binder fibers=70 percent by weight (wt. %) : 30 wt. % to 50 wt. % : 50 wt. %, and the waterproof protective film has a basis weight of 100 g/m² to 400 g/m².

A fourth aspect of the present disclosure is directed to a method for fabricating the vehicle fender liner of one of the first through third aspects, and the method includes the steps of: producing a fibrous web of the base-material layer, the fibrous web including the main fibers and the binder fibers; covering a surface of the fibrous web with a molten resin of an LDPE resin, and pressing, with a roller, the surface of the fibrous web covered with the molten resin, thereby forming a multilayer sheet in which a waterproof protective film of an LDPE resin is bonded to the base-material layer; and molding the multilayer sheet with heat, thereby producing a vehicle fender liner.

Advantages of the Invention

In the first aspect, in the base-material layer, it is possible to form a large number of minute cells which are spaces enclosed by a fibrous web made of main fibers and binder fibers, thus increasing the sound absorption effect. In addition, the waterproof protective film integrally provided on the surface of the base-material layer can provide an anti-icing function, and enhancing the sound-absorption performance of the fender liner.

Furthermore, the waterproof protective film has high resistance to damage on the surface by splashed stones or the like, and exhibits excellent sound insulation. In addition, the waterproof protective film can prevent entering of mud, dirt, dust, and the like into the substantially mesh structure of the base-material layer. Consequently, the fender liner can be easily formed into a solid shape and maintain a high sound absorption effect for a long period. In particular, since the LDPE resin forming the waterproof protective film is relatively soft to have high extensibility, and has high impact resistance, high resistance to damage, and high formability, in press molding the waterproof protective film together with the base-material layer, the waterproof protective film can follow the shape of the base-material layer to be formed in a solid shape (i.e., a solid three-dimensional shape) as intended.

In the second aspect, since the LDPE resin melts, the waterproof protective film has excellent formability, and well follows the base-material layer. As a result, the waterproof protective film can be formed into a solid shape as intended, and it is possible to prevent the waterproof protective film from being locally thin in molding or being partially removed in extreme cases.

In the third aspect, the base-material layer having an excellent substantially mesh structure to enhance the sound-absorption performance and the waterproof protective film can be bonded together without fail, and a solid shape can be easily formed. The waterproof protective film maintains impact resistance and anti-icing function, and a large number of minute cells are formed in the base-material layer, thus enhancing the sound-absorption performance.

In the fourth aspect, the fender liner can be easily formed into a solid shape, and a high sound absorption effect can be maintained for a long period. In particular, since the LDPE resin forming the waterproof protective film is relatively soft to have high extensibility, and has high impact resistance, high resistance to damage, and high formability, in press molding the waterproof protective film together with the base-material layer, the waterproof protective film can follow the shape of the base-material layer to be formed in a solid shape (i.e., a solid three-dimensional shape) as intended.

BRIEF DESCRIPTION OF THE DRAWINGS

FIG. 11 is a table showing results of measurement with the icing power measurement apparatus illustrated in FIG. 10 and test results on the surface condition obtained by a stone chip test.

FIG. 13 is a table showing the degree of extensibility measured with the apparatus illustrated in FIG. 12.

DESCRIPTION OF EMBODIMENTS

Figure 1:
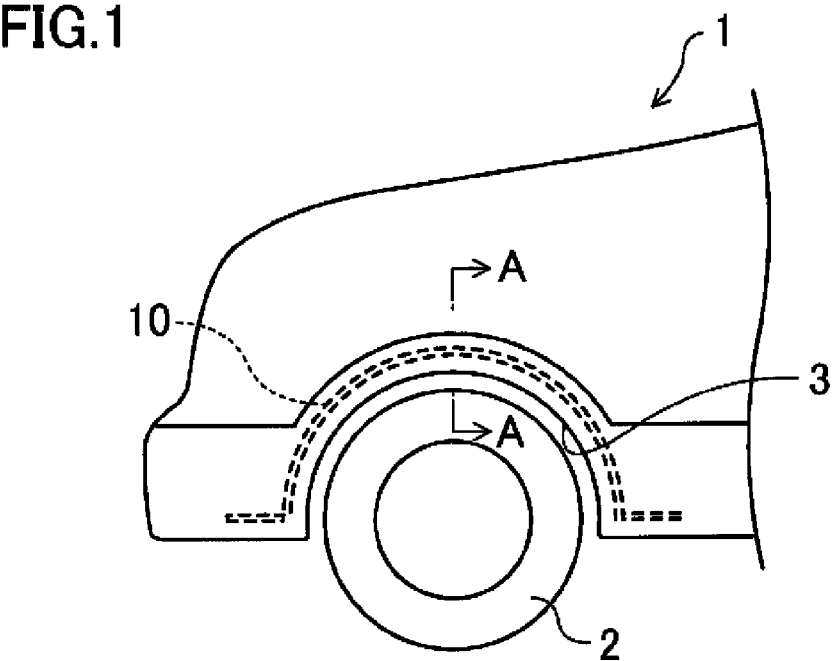
FIG. 1 is a partial side view illustrating a front part of a vehicle equipped with a fender liner according to an embodiment of the present disclosure.
Figure 2:
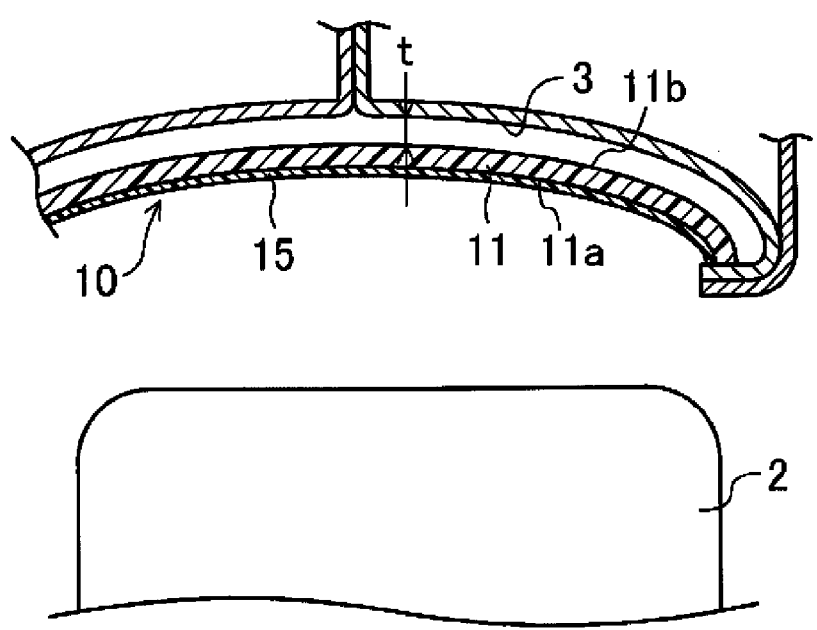
FIG. 2 is an enlarged cross-sectional view taken along line A-A in FIG. 1, and illustrates the fender liner and its peripheral part.
Figure 3:
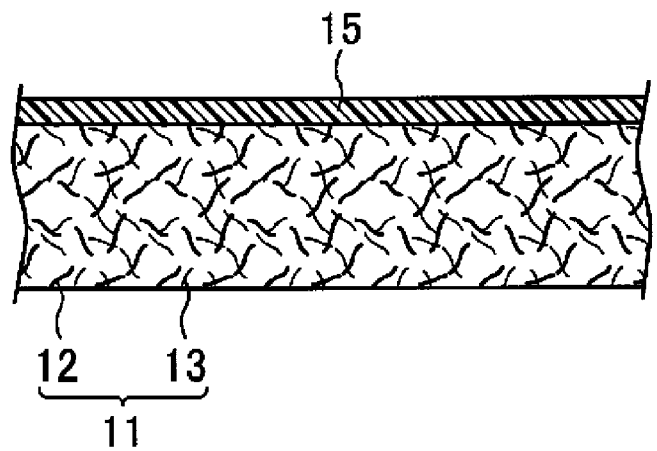
FIG. 3 is an enlarged partial view of the fender liner.
Figure 4:
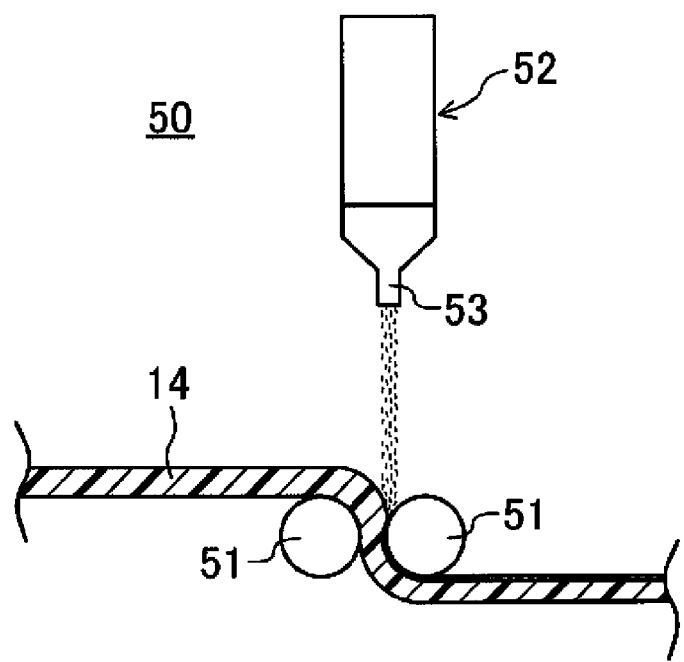
FIG. 4 is a view schematically illustrating apparatus for fabricating a fender liner.

FIG. 1 is a partial side view illustrating a front part of a vehicle equipped with a fender liner according to an embodiment of the present disclosure. FIG. 2 is an enlarged cross-sectional view taken along line A-A in FIG. 1, and illustrates the fender liner and its peripheral part. FIG. 3 is an enlarged partial view of the fender liner. FIG. 4 is a view schematically illustrating apparatus for fabricating a fender liner.

In a vehicle 1, tires 2 are generally provided at the left front, the right front, the left rear, and the right rear, respectively. Wheelhouses 3 are disposed above the respective tires 2. The wheelhouses 3 are also called wheelhouse panels or wheel housings, and form part of the vehicle body. The wheelhouses 3 are made of a metal, and are formed to cover the respective tires 2 from above the tires 2. The surfaces of the wheelhouses 3 facing the tires 2 are part of the outer surface of the vehicle, and covered with fender liners 10 attached to the respective wheelhouses 3. The fender liners 10 serve as attachment parts of the vehicle 1, and are intended to prevent a body panel from being damaged by stones, muddy water, or other substances bounced off the road surface by tires 2 during driving of the vehicle 1 and to reduce noise such as road noise produced between the tires 2 and the road surface. As illustrated in FIGS. 1 and 2, the fender liners 10 are formed along the wheelhouses 3, and attached to the wheelhouses 3 with, for example, fasteners (not shown).

Then, the fender liners 10 of the first embodiment will be briefly described. As illustrated in FIGS. 2 and 3, each of the fender liners 10 is formed along the wheelhouse 3, and includes: a base-material layer 11 facing the wheelhouse 3; and a waterproof protective film 15 facing the tire 2.

The base-material layers 11 is made of nonwoven fabric. The waterproof protective film 15 is made of a waterproof material, and is stacked on a front surface 11a of the base-material layer 11 opposite to the surface thereof facing the wheelhouse 3. On the other hand, no material is basically stacked on a back surface 11b of the base-material layer 11 facing the wheelhouse 3. A gap t is provided between the back surface 11b and the wheelhouse 3.

As illustrated in FIG. 3, the base-material layer 11 made of nonwoven fabric is configured to have a substantially mesh structure in which main fibers 12 and binder fibers 13 made of synthetic fibers which melt by heat are interlocked and welded. Specifically, the binder fibers 13 are configured to be welded and hardened with the main fibers 12 interlocked with each other, thereby allowing the fender liners 10 to be easily formed into a solid three-dimensional shape as intended, and further, ensuring maintenance of the shape. In addition, the binder fibers 13 exist, while keeping their fiber form as interlocked fibers forming the base-material layer 11 together with the main fibers 12. Thus, the binder fibers 13 considerably contribute to formation of a large number of minute cells in the base-material layer 11. Consequently, a structure (i.e., a substantially mesh structure) configured to enhance the sound-absorption performance of the base-material layer 11 can be easily formed. In particular, the base-material layer 11 is a collection of minute cells which are enclosed by a plurality of fibers, and exhibits a sound absorption effect mainly by these cells.

The main fibers 12 are principal fibers forming nonwoven fabric, and may be natural fibers or chemical fibers. To facilitate processing in fabrication processes of the fender liners 10, the main fibers 12 are preferably made of synthetic fibers such as polyamide (PA) fibers, e.g., nylon fibers, or polyester fibers, e.g., polyethylene terephthalate (PET).

The fiber diameter of the main fibers 12 is preferably in the range from 2 T (dtex) to 17 T, more preferably in the range from 4 T to 10 T, in order to enhance stability in processing in fabrication processes of the fender liners 10. If the fiber diameter of the main fibers 12 is leas than 2 T, the strength might decrease. On the other hand, if the fiber diameter of the main fibers 12 exceeds 17 T, the volume ratio of the main fibers 12 in the entire base-material layer 11 is considerably increased with ease, thus failing to form a large number of cells.

To enhance stability in processing in fabrication processes of the fender liners 10, the main fibers 12 are preferably short fibers whose fiber length is in the range from 10 mm to 100 mm. Further, to form a larger number of minute cells, the main fibers 12 preferably have mechanical crimps, for example.

The binder fibers 13 are principal fibers forming the base-material layer 11 together with the main fibers 12, and are preferably made of a single soluble polymer having a melting point lower than that of the main fibers 12 or made of a core-sheath structure using a soluble polymer as a sheath portion thereof. In view of easy formation of a large number of cells in the base-material layer 11, the binder fibers 13 are preferably synthetic fibers made of a single soluble polymer which can be easily formed into a more slender form than bicomponent fibers, and are most preferably polyester fibers, especially PET fibers having a low melting point of 100° C. to 130° C. because the PET fibers have excellent formability, and are readily available and inexpensive. In addition, advantageously, the polyester fibers can be efficiently recycled.

The binder fibers 13 may be fibers which are made of a thermoplastic resin and in which an additive such as a filler is added to a thermoplastic resin, for example, and also may be fibers of a thermoplastic resin including polyolefin such as polyethylene (PE) or polypropylene (PP), polyester such as PET, and polyamide, fibers of a thermoplastic resin whose melting point is adjusted by modifying one of the above-mentioned thermoplastic resins, or fibers of a material in which an additive such as a filler is added to one of the above-mentioned thermoplastic resins, for example. In a case where the binder fibers 13 are fibers compatible with the main fibers 12, for example, the main fibers 12 and the binder fibers 13 are well bonded together, thereby providing the base-material layer 11 with a sufficient shape retaining ability.

Furthermore, the binder fibers 13 may be fibers in which fibers usable for the binder fibers 13 serve as a sheath portion and the periphery of a core portion having a melting point higher than that of the sheath portion is surrounded with the sheath portion. In this case, the core portion may be fibers usable for the main fibers 12. The combination of the core portion and the sheath portion may be PP and PE, PET and PE, or PET having a high melting point and PET having a low melting point, for example. In the case of applying fibers with a core-sheath structure to the binder fibers 13, only the sheath portion melts and the core portion does not melt when heated, thereby enhancing the shape retaining ability of the fender liner 10 formed into a solid shape. In the case of such core-sheath structures, the melting point of fibers forming the sheath portion is preferably in the range from 100° C. to 130° C., and fibers forming the core portion do not need to have a melting point lower than that of the main fibers 12, and is rather preferably has a melting point equal to or higher than that of the main fibers 12.

The fiber diameter of the binder fibers 13 is preferably in the range from 2 T to 17 T, especially in the range from 4 T to 10 T, in order to enhance stability in processing in fabrication processes of the fender liners 10. If the fiber diameter of the binder fibers 13 is less than 2 T, the strength might decrease. In addition, the binder fibers 13 melt in press molding, and cannot keep fiber forms, resulting in that the binder fibers 13 might not contribute to formation of cells. On the other hand, if the fiber diameter of the binder fibers 13 exceeds 17 T, the volume ratio of the binder fibers 13 in the entire base-material layer 11 is considerably increased with ease, thus failing to form a large number of cells.

To enhance stability in processing in fabrication processes of the fender liners 10, the binder fibers 13 are preferably short fibers whose fiber length is in the range from 10 mm to 100 mm. Further, to form a larger number of minute cells, the binder fibers 13 preferably have mechanical crimps, for example.

The thickness of the base-material layer 11 (after formation) is preferably in the range from 1 mm to 6 mm, and more preferably in the range from 2 mm to 4 mm. If the thickness of the base-material layer 11 is less than 1 mm, the fender liner 10 cannot obtain a sufficient rigidity obtaining ability and a sufficient shape retaining ability, and a large number of cells cannot be formed, resulting in failing to exhibit a sufficient sound absorption effect. On the other hand, if the thickness of the base-material layer 11 exceeds 6 mm, the weight of the fender liner 10 cannot be reduced, and the cost thereof increases.

The basis weight of the base-material layer 11 needs to be 300 g/m² or more in order to obtain formability and rigidity, and is preferably 1000 g/m² or less because an excessively large basis weight leads to increases in cost and weight. To prevent an excessive entry of the waterproof protective film, the basis weight of the base-material layer 11 is preferably 300 g/m² or more, especially in the range from 400 g/m² to 700 g/m².

The content of the binder fibers 13 in the base-material layer 11 is preferably in the range from 30 percent by weight (wt. %) to 50 wt. %, and more preferably in the range from 35 wt. % to 45 wt. %. If the content of the binder fibers 13 in the base-material layer 11 is less than 30 wt. %, form stability of the fender liner 10 formed into a solid shape cannot be sufficiently maintained. On the other hand, if the content of the binder fibers 13 in the base-material layer 11 exceeds 50 wt. %, the content of the main fibers 12 which play an important role in maintaining the strength of the base-material layer 11 relatively decreases, resulting in failing to sufficiently increase the strength and durability of the fender liner 10.

The waterproof protective film 15 is made of a low-density polyethylene (LDPE) resin. The reason why the LDPE resin is used for the waterproof protective film 15 is that the fender liner 10 can be easily formed into a solid shape and exhibits both superior sound-absorption performance and excellent anti-icing, and detailed reasons will be described later. The waterproof protective film 15 absorbs road noise during driving, and repels rainwater and muddy water splashed from the road surface by tires 2 to reduce contamination of the outer surface of the fender liner 10 and prevent icing.

The basis weight of the waterproof protective film 15 is in the range from 100 g/m² to 400 g/m², and is preferably in the range from 200 g/m² to 300 g/m². If the basis weight of the waterproof protective film 15 is less than 100 g/m², shortage of the waterproof protective film 15 occurs, i.e., the waterproof protective film 15 becomes locally thin, and is likely to be absent in some parts. On the other hand, if the basis weight of the waterproof protective film 15 exceeds 400 g/m², the sound absorption effect is more likely to be impaired.

The thickness of the waterproof protective film 15 after formation is preferably in the range from 50 μm to 500 μm, and more preferably in the range from 60 μm to 400 μm. If the thickness of the waterproof protective film 15 is less than 50 μm, the waterproof protective film is very easily broken. On the other hand, if the thickness of the waterproof protective film 15 exceeds 500 μm, superior sound absorption by film vibration cannot be induced, and the sound absorption effect on road noise might be impaired.

Properties of the waterproof protective film 15 will be described below. The reason why the waterproof protective film 15 is made of an LDPE resin is that the LDPE resin has air-imperviousness and an anti-adhesion property (to which an object is not easily attached), is relatively soft to have high extensibility, and has high impact resistance, high resistance to damage, and high formability.

Properties of the waterproof protective film 15, i.e., the LDPE resin, will be described hereinafter. The melting point of the waterproof protective film 15 is preferably in the range from 100° C. to 130° C., and more preferably in the range from 105° C. to 120° C. If the melting point of the waterproof protective film 15 is excessively high, flowability becomes insufficient during hot press molding, and the waterproof protective film 15 cannot follow the base-material layer 11 in the direction of formation of the base-material layer 11, thereby degrading formability. On the other hand, if the melting point of the waterproof protective film 15 is excessively low, the waterproof protective film 15 excessively melts to enter the base-material layer 11, thereby increasing the possibility of removing the waterproof protective film 15. In particular, the above-mentioned temperature range is preferable because in this temperature range, the waterproof protective film 15 melts to the same degree as the binder fibers 13 in the base-material layer 11 during hot press molding, to be easily formed, following the base-material layer 11, during formation of the base-material layer 11. The MI value of the waterproof protective film 15 is preferably in the range from 1 (one) to 100 g/10 min, and more preferably in the range from 3 to 50 g/10 min. If the MI value of the waterproof protective film 15 is excessively high, the waterproof protective film 15 easily enters the base-material layer. If the MI value of the waterproof protective film 15 is excessively low, adhesion power is insufficient. For these reasons, the above-mentioned range is preferable. The softening point of the waterproof protective film 15 is preferably in the range from 80° C. to 100° C.

A method for fabricating the fender liner 10 will be described hereinafter.

First, a fibrous web 14 (see FIG. 4) made of drylaid nonwoven fabric is formed in a sheet form using main fibers 12 and binder fibers 13. Then, the fibers 12 and 13 in the fibrous web 14 are intertwined with each other by needlepunching to be interlocked. Then, as illustrated in FIG. 4, the sheet of the fibrous web 14 is conveyed to rollers 51 of fabrication apparatus 50. A container 52 for a waterproof protective film is provided above the rollers 51 for compressing the sheet of the fibrous web 14. In this container 52, a material for a waterproof protective film is maintained with heat at a temperature about 20° C. higher than the melting point of the material, and is dropped in the form of a high-viscosity material in a melted state through an outlet 53 of the container 52 to be deposited on the surface of the fibrous web 14. The resultant material and the fibrous web 14 are immediately pressed and bonded by the rollers 51 with the material overlaid on the surface of the fibrous web 14. Through the foregoing process, a multilayer sheet material in which a waterproof protective film 15 made of an LDPE resin is bonded to the surface of a base-material layer 11 made of the fibrous web 14 is formed.

In particular, in the case of forming a multilayer sheet in the manner described above, part of a fluid of the waterproof protective film 15 enters cells in the base-material layer. However, entering of a large amount of the fluid can be prevented by appropriately setting the density (basis weight) of the base-material layer 11, the MI value and the melting point of the waterproof protective film 15, and heating conditions, for example. This setting allows the waterproof protective film 15 to be firmly bonded to the base-material layer 11, and ensures formation of a residue of the waterproof protective film 15 on the surface of the base-material layer 11 even after press molding with heating and melting of the waterproof protective film 15.

Next, the process of hot press molding will be described. The multilayer sheet material produced in the manner described above is heated with, for example, a heater (not shown) using far infrared radiation, and carried into a press die. At this time, the heat temperature is higher than or equal to the melting point of a single soluble polymer constituting the binder fibers 13. If the main fibers 12 are made of fibers which melt by heat, the heat temperature is lower than the melting point of the main fibers 12, Since the waterproof protective film 15 has a melting point substantially equal to that of the binder fibers 13, the waterproof protective film 15 is also in a melted state and has high flowability during heating, in the same manner as the binder fibers 13. Melting of the waterproof protective film 15 in the same manner as the binder fibers 13 in the base-material layer 11 increases formability during press molding, thus reducing a partial decrease in the thickness of the waterproof protective film 15 during press molding. In addition, the size of cells in the base-material layer 11 and the basis weight thereof are set so as to prevent entering of the melted waterproof protective film 15 into the base-material layer 11, and part of the waterproof protective film 15 already covers and enters the surface of the base-material layer 11 before the hot press molding. Accordingly, it is possible to prevent the waterproof protective film 15 from further entering the base-material layer 11 to be removed.

In this embodiment, the multilayer sheet made of the base-material layer 11 and the waterproof protective film 15 is previously heated with another heating means before the multilayer sheet is set in the press die. Alternatively, this heating means may be omitted by molding the multilayer sheet with a heated press die.

The base-material layer is preferably heated at a temperature of 180° C. to 220° C., and the waterproof protective film is preferably heated at a temperature of 130° C. to 220° C. The base-material layer and the waterproof protective film are preferably heated for a period of 20 seconds to 2 minutes, and more preferably for a period of 30 seconds to 60 seconds, An excessively low heating temperature impairs formability, whereas an excessively high heating temperature causes the waterproof protective film to easily enter the base-material layer. An excessively short heating period causes insufficient formation, whereas an excessively long heating period causes the waterproof protective film to easily enter the base-material layer.

Advantages obtained in the embodiment of the present disclosure will be described hereinafter. In the fender liners 10, it is possible to prevent the outer surface of the fender liners 10 from being damaged by stones and mud splashed from the road surface by the tires 2. In addition, in the fender liners 10, the base-material layer 11 absorbs car driving noise produced between the tires 2 and the road surface, hitting noise produced when stones, sand, water, and others splashed by the tires 2 hit the fender liners 10, ambient noise such as road noise is absorbed in the base-material layer 11, and transmission of the noise into the inside of the vehicle 1 can be significantly reduced. Specifically, the noise is transmitted from the thin waterproof protective film 15 forming the outermost layer of the fender liner 10 to the base-material layer 11, and then the base-material layer 11 attenuates the sound energy, thereby reducing the amount of noise transmitted to the inside of the vehicle.

The fender liners 10 is configured such that the waterproof protective film 15 repels rainwater and muddy water splashed from the road surface by the tires 2, thereby preventing icing and effectively reducing contamination of the outer surface of the fender liners 10 with mud and dirt, for example. Further, since the waterproof protective film 15 prevents rainwater and muddy water from entering the base-material layer 11, the sound-absorption function is not impaired.

EXAMPLES

Examples of the present invention will be specifically described hereinafter. The present invention will be specifically described using examples, but is not limited to these examples.

Example 1

As main fibers, PET fibers having a fiber diameter of 6.6 T, a fiber length of 64 mm, and a melting point of 260° C. were used. As binder fibers, PET fibers having a fiber diameter of 6.6 T, a fiber length of 51 mm, and a melting point of 110° C. were used. As a material forming a waterproof protective film, an LDPE resin having a density of about 0.92, a melting point of 110° C., a tensile strength of 14 MPa, an MI value of 20 g/10 min, and a softening point of 100° C. was used.

Then, 60 wt. % of the main fibers and 40 wt. % of the binders fiber were mixed such that the total basis weight is 600 g/m$^2$, and were interlocked by needlepunching, thereby forming a web material in the shape of a sheet. An LDPE material was heated to 130° C., and was caused to flow as a high-viscosity solution to cover the surface of the sheet-shaped web material with the basis weight thereof set at 200 g/m$^2$. The LDPE material and the sheet-shaped web material were pressed by rollers, and bonded together, thereby forming a multilayer sheet.

Thereafter, the multilayer sheet was heated at 210° C. at the side of the base-material layer and at 150° C. at the side of the waterproof protective film, held for 10 seconds, and then placed into a press die, to be molded in the shape of a fender liner. After the molding, the base-material layer had a thickness of 2.55 mm and a basis weight of 600 g/m$^2$, the waterproof protective film of the LDPE resin had a thickness of 0.25 mm and a basis weight of 200 g/m$^2$. The total thickness of the base-material layer and the waterproof protective film was 2.8 mm.

Since the thicknesses of the base-material layer and the waterproof protective film were not uniform, the thicknesses of the entire part of the base-material layer and the waterproof protective film were averaged. Alternatively, the average value may be calculated using the thickness of most parts of the base-material layer and the waterproof protective film.

Example 2

Example 2 differs from Example 1 only in that the basis weights of the base-material layer and the waterproof protective film were 700 g/m$^2$ and 200 g/m$^2$, respectively, in Example 2.

Example 3

Example 3 differs from Example 1 only in that the basis weights of the base-material layer and the waterproof protective film were 600 g/m$^2$ and 300 g/m$^2$, respectively, in Example 3.

Example 4

Example 4 differs from Example 1 only in that the basis weights of the base-material layer and the waterproof protective film were 700 g/m$^2$ and 300 g/m$^2$, respectively, in Example 4.

Example 5

In Example 5, the fender liner is fabricated using the same material as that used in Example 1, and a gap t between the fender liner and a metal plate is set as t=10 mm.

Example 6

In Example 6, the fender liner is fabricated using the same material as that used in Example 1, and a gap t between the fender liner and a metal plate is set as t=20 mm.

Comparative Example 1

Comparative Example 1 is an example of nonwoven fabric produced by interlocking main fibers and binder fibers with each other. As the main fibers, PET fibers having a fiber diameter of 6.6 T, a fiber length of 64 mm, and a melting point of 260° C. were used. As the binder fibers, PET fibers having a fiber diameter of 6.6 T, a fiber length of 51 mm, a melting point of 110° C. were used. Further, acrylic resin was mixed in the fibers. The thickness of the nonwoven fabric was 3.3 mm with the basis weight of the main fibers and the binder fibers set at 630 g/m$^2$, and the basis weight of the acrylic resin set at 270 g/m$^2$. The resultant nonwoven fabric will be hereinafter referred to as Comparative Example 1 (nonwoven fabric) for simplicity.

Comparative Example 2

Comparative Example 2 is an example of a resin sheet material. Using an HDPE resin as a component for a resin sheet material, a sheet material having a thickness of 1.2 mm was formed. The HDPE resin used in this example had a basis weight of 1100 g/m$^2$, a density of about 0.95, a melting point of 150° C., a tensile strength of 40 MPa, an MI value of 1.4 g/10 min, and a softening point of 130° C. This HDPE resin will be hereinafter referred to as Comparative Example 2 (HDPE) for simplicity.

Comparative Example 3

Comparative Example 3 is an example in which the waterproof protective film is provided on the base-material layer made of nonwoven fabric. For this the base-material layer, the main fibers and the binder fibers as those used in Example 1 were used. For the waterproof protective film, not the LDPE resin used in Example 1 but the HDPE resin was used.

In this example, HDPE had a basis weight of 200 g/m$^2$, a density of about 0.95, a melting point of 150° C., a tensile strength of 40 MPa, an MI value of 1.4 g/10 min, and a softening point of 130° C. These layers will be hereinafter referred to as Comparative Example 3 (nonwoven fabric/HDPE) for simplicity.

(Test Method for Sound Absorption Test)

Sound absorption coefficients of samples of Examples 1 to 4 and Comparative Example 1 (nonwoven fabric) were measured in the frequency range from 200 Hz to 6300 Hz based on ISO 354, Acoustics—Measurement of Sound Absorption in Reverberation Room, using measurement apparatus produced by Brüel & Kjær Sound & Vibration Measurement A/S. The measurement results are shown in FIG. 5.

Figure 5:
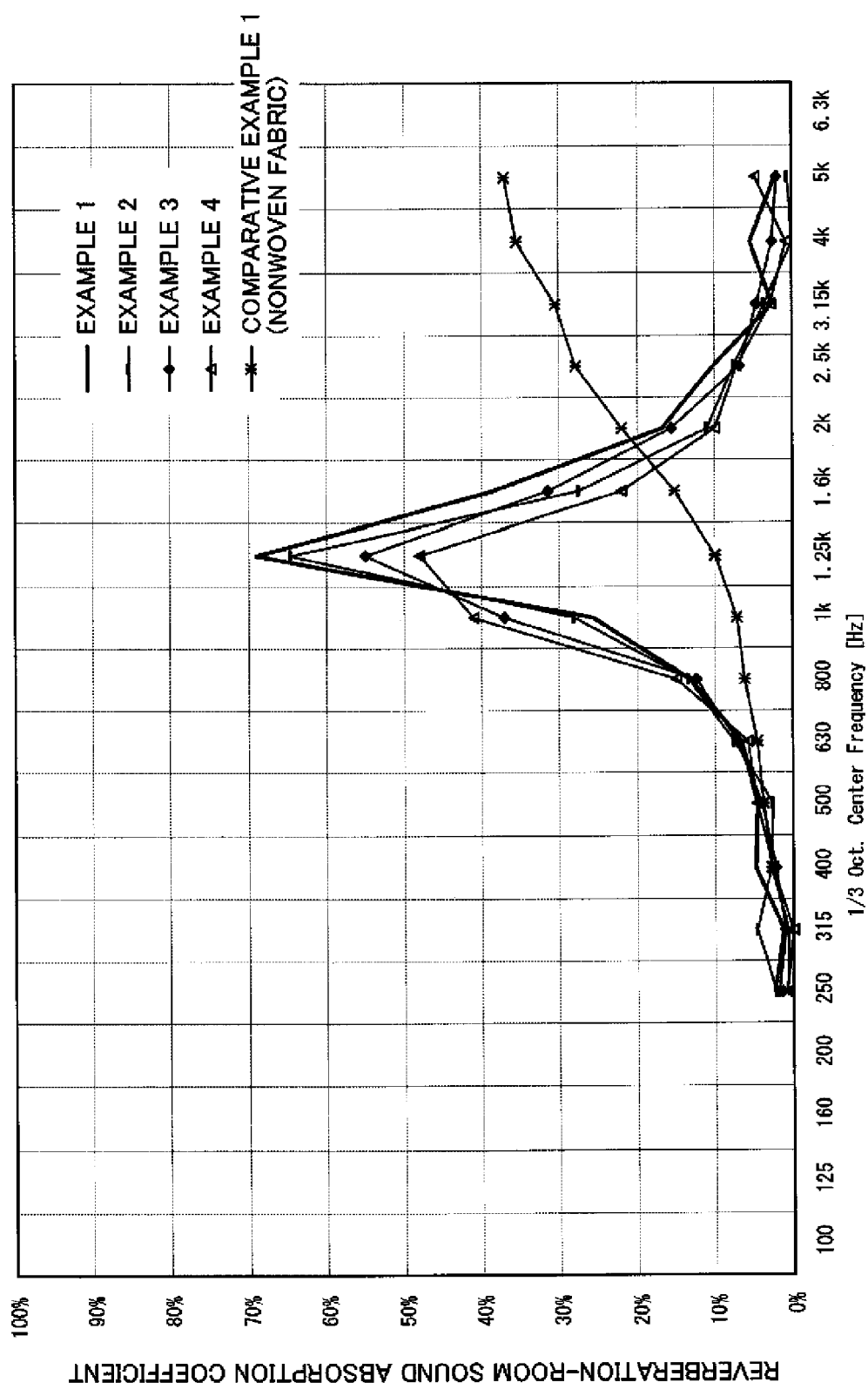
FIG. 5 is a graph showing a reverberation-room sound absorption coefficient (%) with respect to a frequency range (Hz) for each ⅓ octave band in Examples 1 to 4 and Comparative Example 1.

FIG. 5 is a graph showing a reverberation-room sound absorption coefficient (%) with respect to a frequency range (Hz) for each ⅓ octave band in Examples 1 to 4 and Comparative Example 1. As shown in FIG. 5, sound absorption coefficients of Examples 1 to 4 were relatively high in the frequency range from 800 Hz to 2000 Hz. This frequency range includes a mid-frequency range in which sound is relatively easily heard by human ears, and particularly includes 2000 Hz at which human ears have the highest sensitivity.

On the other hand, in Comparative Example 1 (nonwoven fabric), an expected level of the sound absorption coefficient could not be obtained in the above-mentioned range. This is because of the following reasons. In the examples of the present disclosure, since a soft LDPE resin having air-imperviousness is employed as a waterproof protective film, and is stacked together with a base-material layer of nonwoven fabric, the combination of the waterproof protective film and the base-material layer induces sound absorption by film vibration due to resonance.

Figure 6:
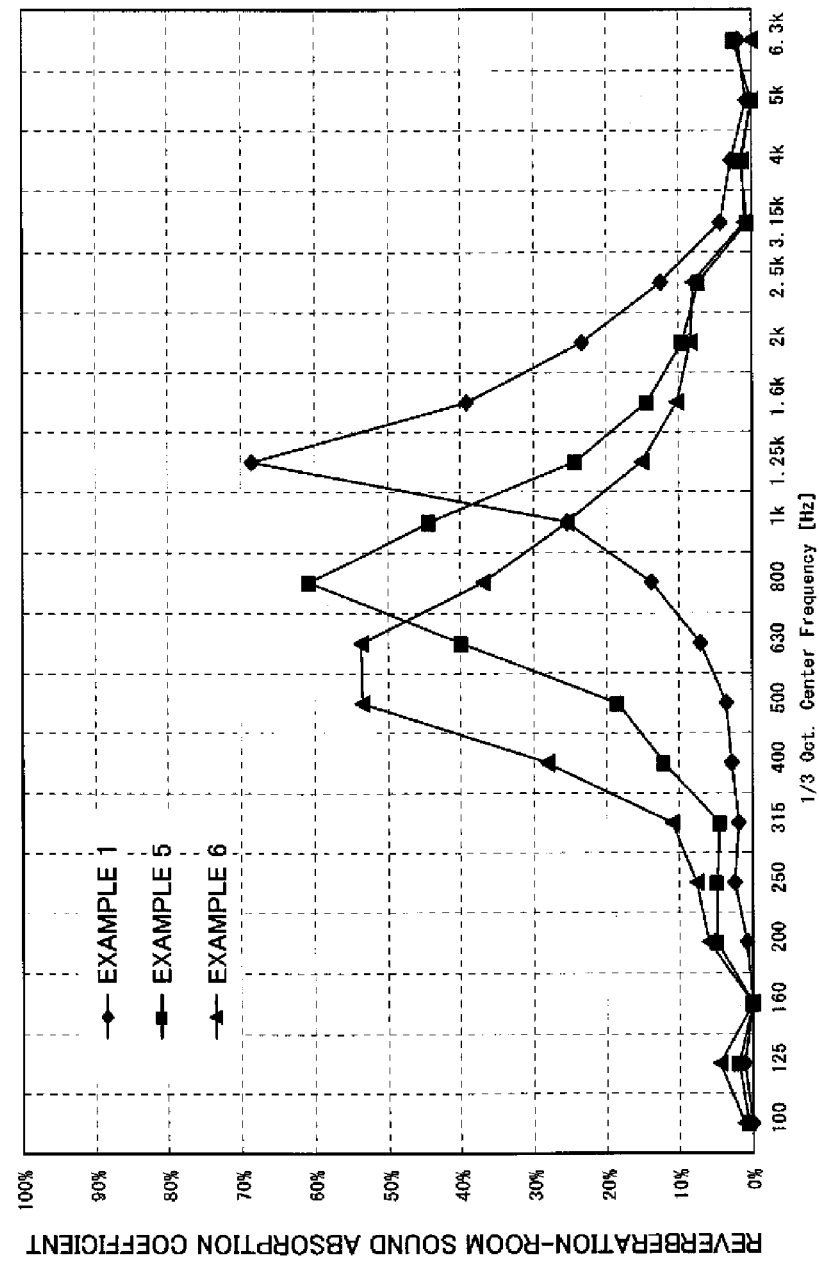
FIG. 6 is a graph showing a reverberation-room sound absorption coefficient (%) with respect to a frequency range (Hz) for each ⅓ octave band in Examples 1, 5, and 6.

FIG. 6 shows measurement results of sound absorption coefficients in a case where no gaps are provided between the wheelhouse 3 and the fender liner 10 and a case where a gap is provided between the wheelhouse 3 and the fender liner 10. In practice, using prepared samples, the gap t (see FIG. 2) between the fender liner 10 and the metal plate was zero in Example 1, and the gaps t between the fender liner 10 and the metal plate were 10 mm and 20 mm in Examples 5 and 6, respectively. Examples 5 and 6 differ from Example 1 only in the gap.

As shown in FIG. 6, according to the present disclosure, the gap is adjusted to select the frequency range in which a peak of the sound absorption coefficient is present. This frequency range can be arbitrarily selected. It is expected that the same holds in other Examples 2 to 4, and thus measurements were omitted for these examples.

(Test Method for Stone Bouncing Impact Noise)

Simple stone bouncing impact noise measurement apparatus was used to evaluate sound radiation with respect to random impact caused by stones or the like bounced off from the tires and hitting the fender liner during driving of an actual vehicle.

Figure 7:
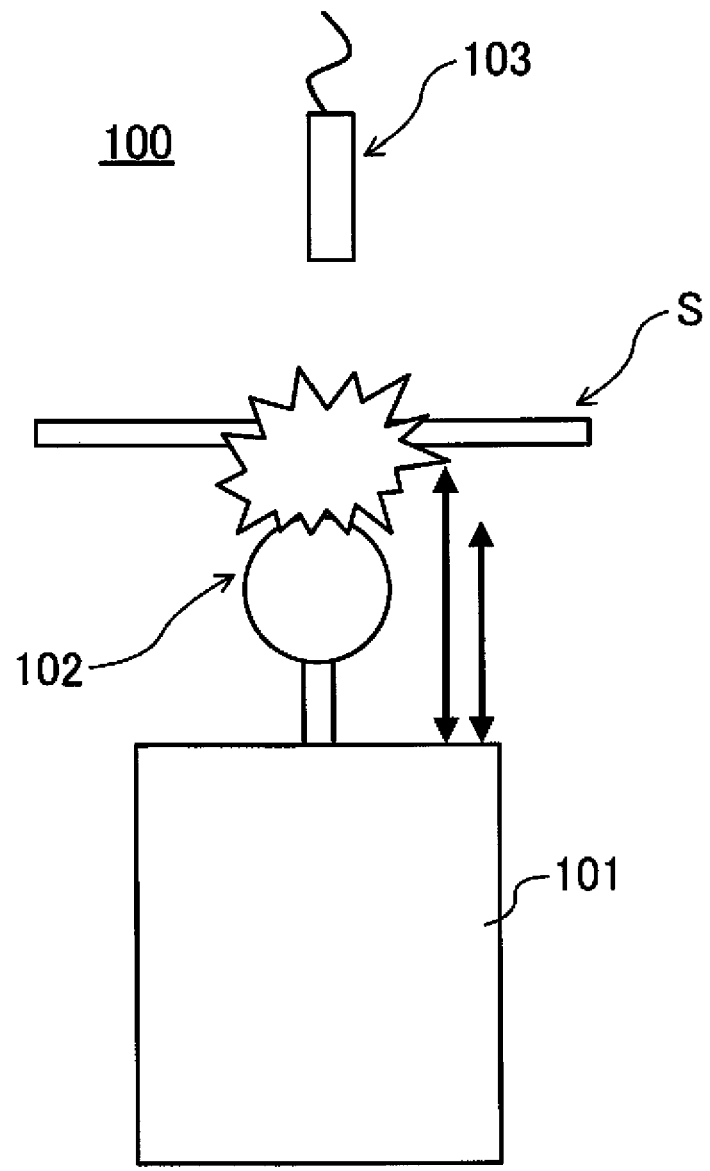
FIG. 7 is a view schematically illustrating stone bouncing impact noise measurement apparatus.

FIG. 7 schematically illustrates the stone bouncing impact noise measurement apparatus 100. The stone bouncing impact noise measurement apparatus 100 includes a vibrator 101 produced by Brüel & Kjær Sound & Vibration Measurement A/S, a steel ball 102 connected to the vibrator 101, and a microphone 103 facing the steel ball 102. The steel ball 102 had a weight of about 100 g and a diameter of 27 mm. The microphone 103 was an intensity probe. The sample S for a test had a size of 300 mm×300 mm. As the sample S, samples of Example 1, Comparative Example 1 (nonwoven fabric), Comparative Example 2 (HDPE), and Comparative Example 3 (nonwoven fabric/HDPE) were used.

Figure 8:
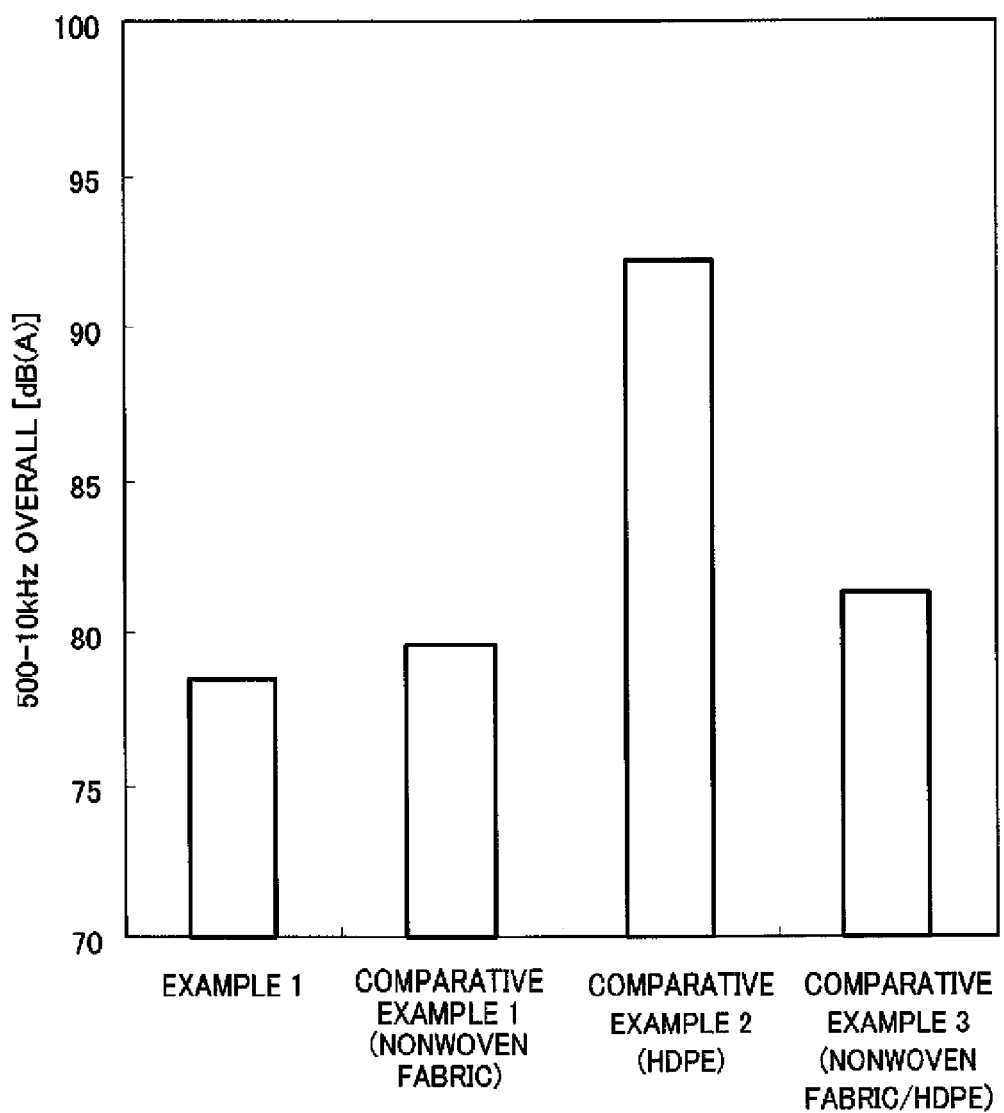
FIG. 8 is a graph showing results obtained by performing frequency analysis, with an A characteristic filter, on values measured by the stone bouncing impact noise measurement apparatus illustrated in FIG. 7, and calculating the obtained results into overall values in the range from 500 Hz to 10 kHz.

In this test, the sample S was placed to be in contact with the steel ball 102, and the microphone 103 was placed at a distance of 150 mm from the sample S. Then, the vibrator 101 was caused to vibrate at random for 10 seconds in the frequency range from 0 (zero) Hz to 400 Hz. In this manner, impact noise was measured. In comparison of data, in consideration of human audibility, frequency analysis was performed with an A characteristic filter, and the result was calculated into an overall value in the range from 500 Hz to 10 kHz. FIG. 8 shows the results. The impact noises were 78.5 dB (A) in Example 1, 79.6 dB (A) in Comparative Example 1 (nonwoven fabric), 92.2 dB (A) in Comparative Example 2 (HDPE), and 81.3 dB (A) in Comparative Example 3 (nonwoven fabric/HDPE). Example 1 showed the best result.

Then, using these samples, the bending strength was measured as a substitute characteristic for the impact absorption function. The bending strength was measured in conformity with JIS K 7171. In this test, the size of the sample S was 50 mm×150 mm, the span was 100 mm, and the test speed was 50 mm/min.

Figure 9:
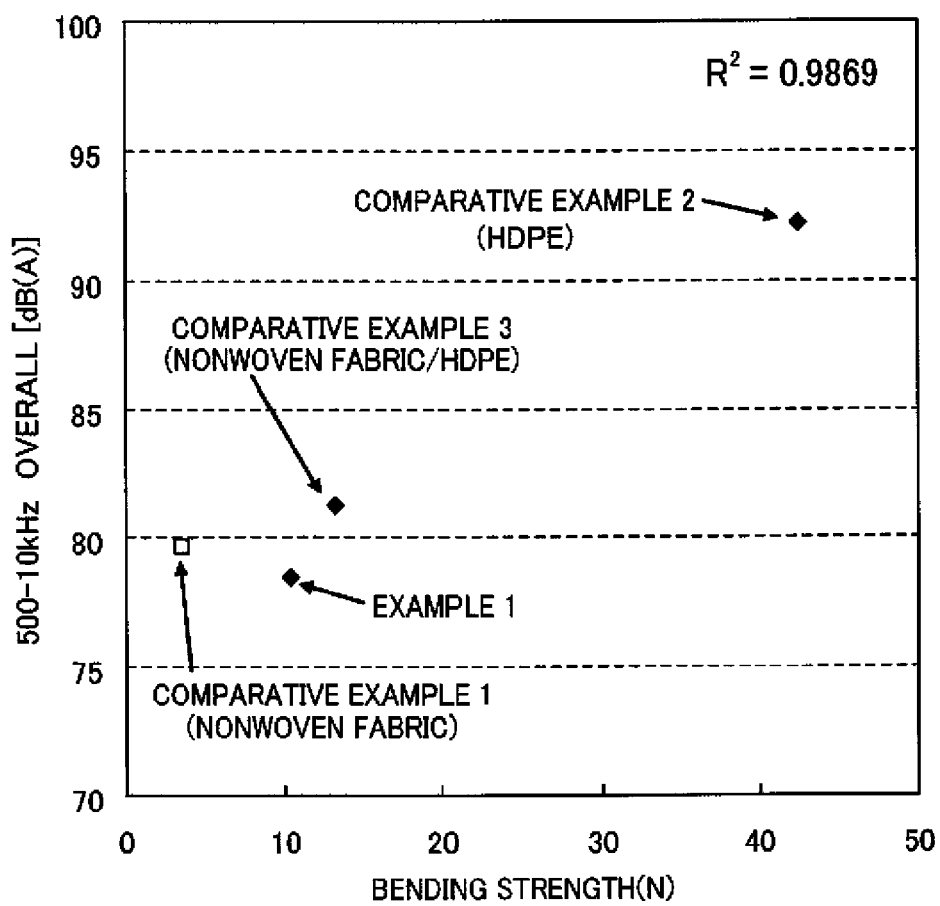
FIG. 9 is a graph showing a relationship between the results of the stone bouncing impact noise obtained in FIG. 8 and the results of the bending strength.

FIG. 9 shows the results of the bending strength and the results of the stone bouncing impact noise obtained in FIG. 8. As shown in FIG. 9, a comparison between Example 1 and Comparative Example 1 (nonwoven fabric) shows that these examples are close to each other with respect to the results on the stone bouncing impact noise as compared to the results of other examples, but are greatly different from each other with respect to the results on the bending strength. A comparison between Example 1 and Comparative Example 3 (nonwoven fabric/HDPE) shows that these examples are close to each other with respect to the results on the bending strength, but are greatly different from each other with respect to the results on the stone bouncing impact noise. Results on both of the stone bouncing impact noise and the bending strength in the Comparative Example 2 (HDPE) were greatly different from those in Example 1.

The above-mentioned results show that as compared to examples of the present disclosure, Comparative Example 1 (nonwoven fabric) shows insufficient bending strength (impact absorption power), Comparative Example 3 (nonwoven fabric/HDPE) shows an insufficient sound absorption coefficient with respect to stone bouncing impact noise, and Comparative Example 2 (HDPE) shows greatly different results on stone bouncing impact noise and bending strength.

(Test Method for Icing Test)

Figure 10:
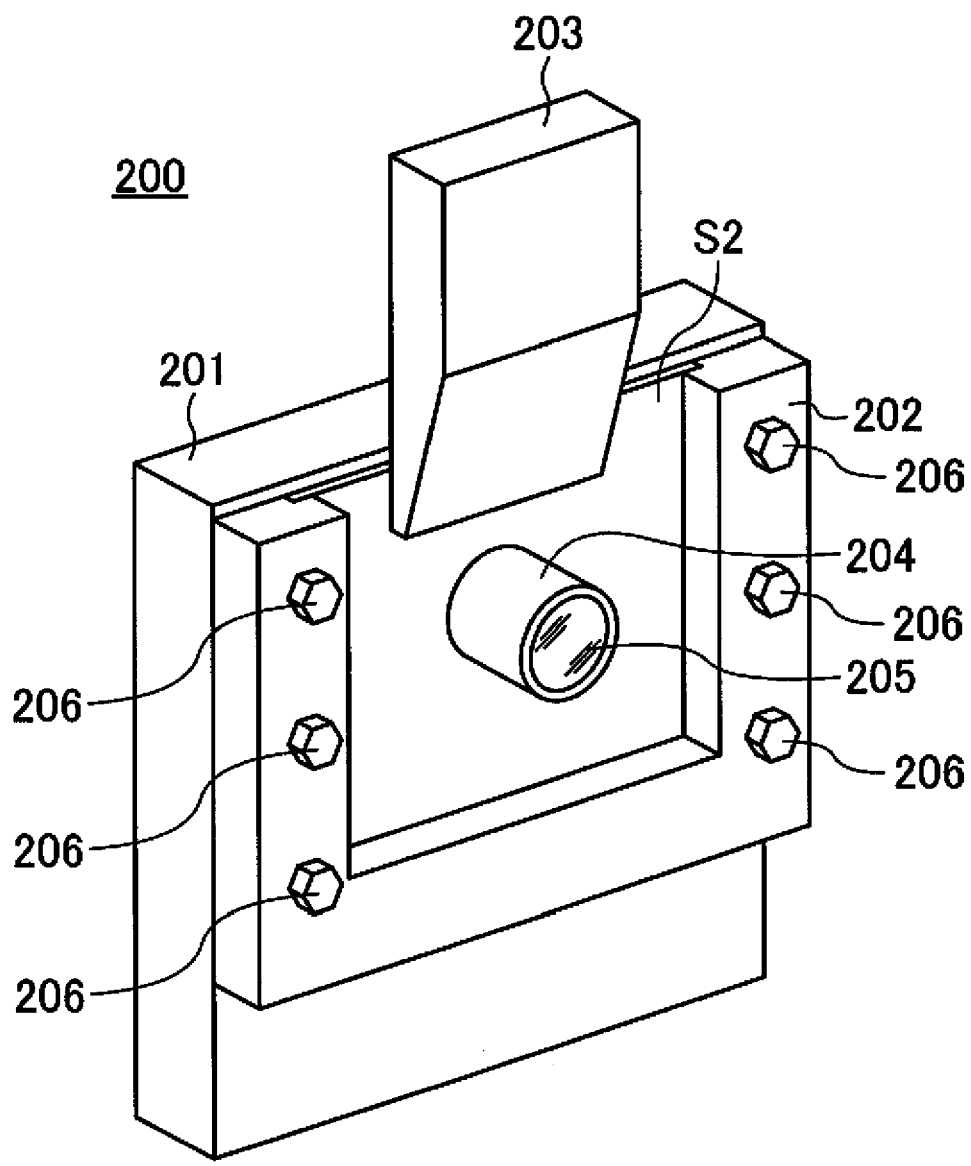
FIG. 10 a perspective view schematically illustrating icing power measurement apparatus.

FIG. 10 schematically illustrates icing power measurement apparatus 200. This apparatus 200 was configured to measure shearing force necessary for shearing ice 205 attached to a sample S2 in a stainless ring member 204 with a pressing member 203. The sample S2 was held between a fixing board 201 made of iron in the shape of a flat plate and a substantially U-shaped retaining member 202 made of iron in the apparatus 200. As the ring member 204, a member made of SUS304 stainless steel and having an inner diameter of 50 mm, an outer diameter of 55 mm, and a height of 40 mm was used. The ring member 204 was placed on the sample S2 previously impregnated with water, and water was poured into the ring member 204, and was frozen. Then, the sample S2 was held between the fixing board 201 and the retaining member 202, and was fixed with bolts 206.

The pressing member 203 was moved toward the ring member 204 at a speed of 10 mm/min so that the maximum force applied to the pressing member 203, i.e., shearing force of the ice 205 attached to the sample, was measured.

The foregoing measurement was performed on the samples of Example 1, Example 4, Comparative Example 1 (nonwoven fabric), Comparative Example 2 (HDPE), and Comparative Example 3 (nonwoven fabric/HDPE). FIG. 11 shows results of measurement of shearing force corresponding to adhesion strength of ice.

FIG. 11 shows that the shearing force was 20 N or less, and even with attachment of ice, the ice was easily removed, i.e., excellent anti-icing performance was obtained, in Examples 1 and 4, Comparative Example 2 (HDPE), and Comparative Example 3 (nonwoven fabric/HDPE). On the other hand, in Comparative Example 1 (nonwoven fabric), the shearing force was 220 N or more, and attached ice was not removed sufficiently. These results confirmed that the fender liner of the present disclosure enables easy removal of attached ice, and exhibits excellent anti-icing performance.

(Durability Test Method with Stone Chip Test)

To evaluate durability of the waterproof protective film against damage on the fender liner caused by stones or the like bounced off by the tires during driving of the actual vehicle, durability of the surface was measured by a stone chip test, which is a durability test defined by JASO M 104. FIG. 11 shows the results.

In the icing test described above, Comparative Example 2 (HDPE) and Comparative Example 3 (nonwoven fabric/HDPE) also obtained excellent anti-icing performance, but Comparative Example 2 (HDPE) showed poor results on the sound-absorption performance evaluated in FIGS. 8 and 9, i.e., exhibited an insufficient sound-absorption performance, as compared to the examples of the present disclosure. As the test result on durability of Comparative Example 3 (nonwoven fabric/HDPE) shown in FIG. 11, the surface waterproof protective film of the HDPE resin were partially split, and minute cracks were also observed. The minute cracks observed in Comparative Example 3 (nonwoven fabric/HDPE) are considered to be because the waterproof protective film of the HDPE resin in Comparative Example 3 (nonwoven fabric/HDPE) had poor extensibility, as compared to the waterproof protective film of the LDPE resin in the examples of the present disclosure.

To confirm the above results, extensibility degrees of Example 1 and Comparative Example 3 (nonwoven fabric/HDPE) were measured using simple measurement apparatus 300 illustrated in FIG. 12.

(Measurement Method of Extensibility Degree)

Figure 12A:
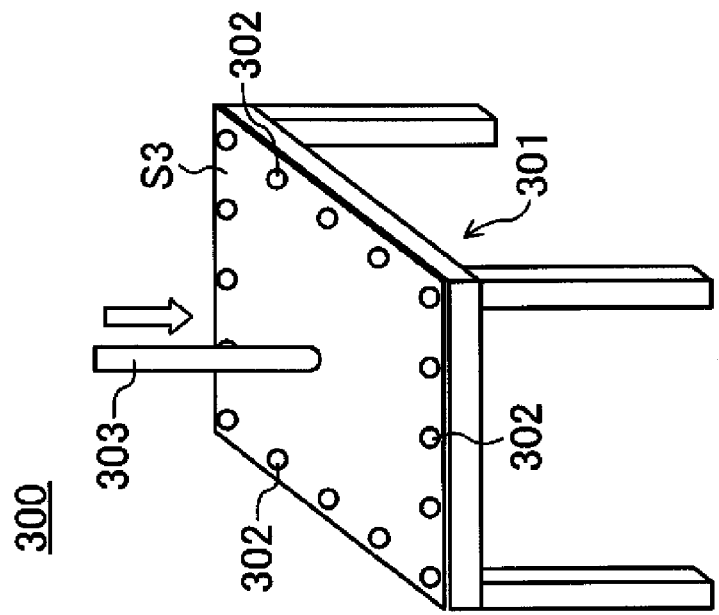
FIG. 12 is a view schematically illustrating measurement apparatus for measuring the degree of extensibility.
Figure 12B:
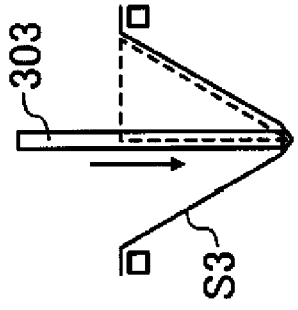
Figure 12C:
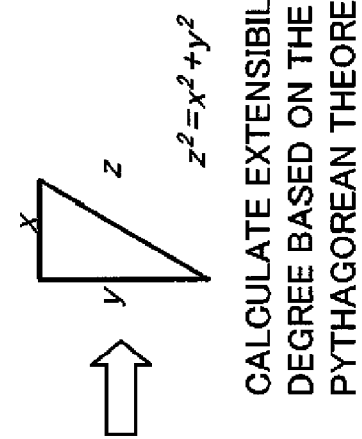

The simple measurement apparatus 300 illustrated in FIG. 12 will be described. As illustrated in FIG. 12(A), the simple measurement apparatus 300 includes a square platform 301 of 250 mm×250 mm. A sample S3 is mounted on the platform 301 with the periphery of the sample S3 fixed with fixing members 302 such as pins. In this mounting, the distance between the fixing members 302 at one side of the platform 301 and the fixing members 302 at the opposite side of the platform 301 was 230 mm. A pressing rod 303 for pressing the center of the sample S3 had a radius of 20 mm at the tip thereof. In measurement, the sample S3 was heated to a predetermined temperature, and the pressing rod 303 pressed the sample S3 at a speed of 900 mm/min until material failure of the sample S3 occurred. The load when the material failure occurred and the extensibility degree were measured. As shown in FIGS. 12(B) and 12(C), with respect to the extensibility degree, the length Z of extension of the sample S3 was obtained from $Z^2=X^2+Y^2$ where Y is the distance to which the sample S3 was pressed and X is the distance between the pressing rod 303 and the pins 302, and the length of extension relative to the original length was calculated. The heating temperatures of the sample 53 were 210° C. at the base-material layer, and 180° C., 150° C., and 110° C. at the waterproof protective film.

Figure 14:
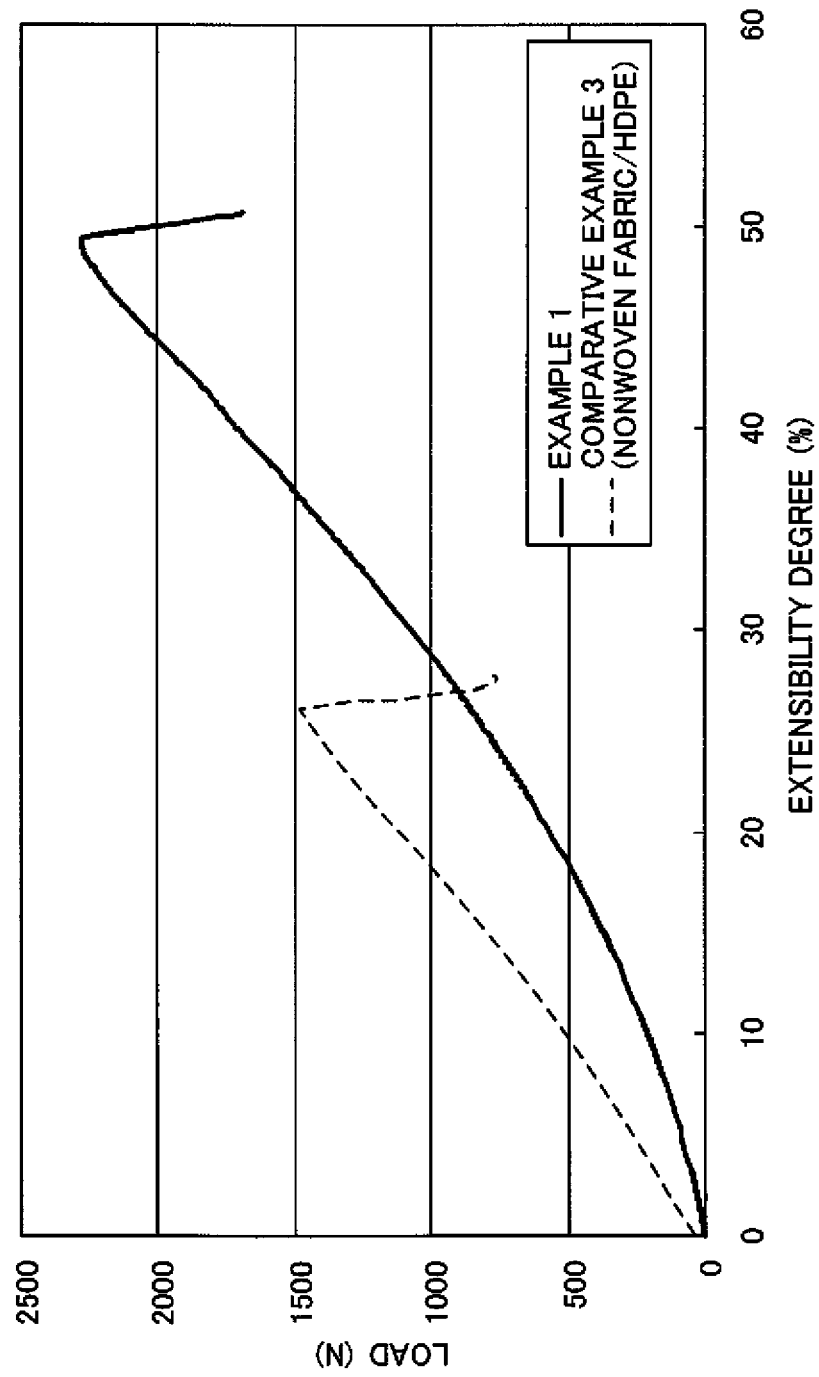
FIG. 14 is a graph showing a relationship between the degree of extensibility measured with the apparatus illustrated in FIG. 12 and a load.

FIG. 13 shows the measurement results. FIG. 14 shows a relationship between the load and the extensibility degree where the heating temperatures were 210° C. at the base-material layer and 150° C. at the waterproof protective film.

As shown in FIGS. 13 and 14, Comparative Example 3 (nonwoven fabric/HDPE) was not extended at all and was broken when the heating temperature at the waterproof protective film was as low as 110° C. Although Comparative Example 3 (nonwoven fabric/HDPE) showed a certain degree of extension when the heating temperature at the waterproof protective film was 150° C. or 180° C., the extensibility degree was lower than that in Example 1 of the present disclosure. This results shows that the waterproof protective film needs to be extended to follow the extension of the base-material layer in molding with the press die, and this follow-up formability was inferior in Comparative Example 3 (nonwoven fabric/HDPE).

As described above, it was confirmed that the fender liner of the present disclosure achieves excellent anti-icing performance and superior sound-absorption performance at the same time.

INDUSTRIAL APPLICABILITY

The present disclosure is advantageously applicable to fender liners of automobiles.

DESCRIPTION OF REFERENCE CHARACTERS 10 fender liner
11 base-material layer
12 main fiber
13 binder fiber
14 fibrous web
15 waterproof protective film
50 fabrication apparatus
100 stone bouncing impact noise measurement apparatus
200 icing power measurement apparatus
300 simple measurement apparatus
S sample

The invention claimed is:

1. A vehicle fender liner, comprising:
a base-material layer having a sound-absorption function; and
a waterproof protective film provided on a surface of the base-material layer, wherein
the base-material layer includes a fibrous web formed by interlocking main fibers and binder fibers having a melting point lower than that of the main fibers, and an LDPE resin is integrally provided as the waterproof protective film,
wherein the waterproof protective film of the LDPE resin has a softening point substantially equal to that of the binder fibers of the base-material layer.

2. The vehicle fender liner of claim 1, wherein the base-material layer has a basis weight of 300 $g/m^2$ to 1000 $g/m^2$,
a ratio of the main fibers to the binder fibers is main fibers: binder fibers=70 percent by weight (wt. %): 30 wt. % to 50 wt. %: 50 wt. %, and
the waterproof protective film has a basis weight of 100 $g/m^2$ to 400 $g/m^2$.

3. A method for fabricating the vehicle fender liner of claim 1, the method comprising the steps of:
producing a fibrous web of the base-material layer, the fibrous web including the main fibers and the binder fibers;
covering a surface of the fibrous web with a molten resin of an LDPE resin, and pressing, with a roller, the surface of the fibrous web covered with the molten resin, thereby forming a multilayer sheet in which a waterproof protective film of an LDPE resin is bonded to the base-material layer; and
molding the multilayer sheet with heat, thereby producing a vehicle fender liner.

* * * * *

UNITED STATES PATENT AND TRADEMARK OFFICE
CERTIFICATE OF CORRECTION

PATENT NO. : 8,556,297 B2
APPLICATION NO. : 13/504119
DATED : October 15, 2013
INVENTOR(S) : Masahiro Uehara Page 1 of 1

It is certified that error appears in the above-identified patent and that said Letters Patent is hereby corrected as shown below:

In the Specification

In column 5 at line 46, Change "polyethlene" to --polyethylene--.

In column 5 at line 52, Change "leas" to --less--.

In column 8 at line 66, Change "12," to --12.--.

In column 9 at line 28, Change "seconds," to --seconds.--.

In column 14 at line 42, Change "53" to --S3--.

Signed and Sealed this
Fourteenth Day of July, 2015

Michelle K. Lee
*Director of the United States Patent and Trademark Office*